US007797183B2

(12) United States Patent
Dias et al.

(10) Patent No.: US 7,797,183 B2
(45) Date of Patent: Sep. 14, 2010

(54) METHOD AND SYSTEM FOR CALCULATING AN ENVIRONMENTAL SCORE FOR A BUSINESS UNIT

(75) Inventors: Daniel Lopez Dias, Surrey (GB); Rafiq Manji, Christchurch (NZ); Andrew Jacobs, Hampshire (GB); Simon Thomas, East Sussex (GB)

(73) Assignee: Trucost PLC (GB)

( * ) Notice: Subject to any disclaimer, the term of this patent is extended or adjusted under 35 U.S.C. 154(b) by 1391 days.

(21) Appl. No.: 10/857,633

(22) Filed: May 28, 2004

(65) Prior Publication Data
US 2005/0021389 A1 Jan. 27, 2005

Related U.S. Application Data (63) Continuation of application No. PCT/GB01/05265, filed on Nov. 29, 2001.

(51) Int. Cl.
G06F 17/30 (2006.01)
G07G 1/00 (2006.01)
G06Q 10/00 (2006.01)
G06Q 30/00 (2006.01)

(52) U.S. Cl. .......................................... 705/10; 705/30
(58) Field of Classification Search ........................ None
See application file for complete search history.

(56) References Cited

U.S. PATENT DOCUMENTS

| 5,293,309 | A | 3/1994 | Sakai et al. |
| 5,412,756 | A | 5/1995 | Bauman et al. |
| 5,546,564 | A | 8/1996 | Horie |
| 7,092,898 | B1 * | 8/2006 | Mattick et al. ................ 705/26 |

| 2003/0018487 | A1 * | 1/2003 | Young et al. .................... 705/1 |
| 2003/0028527 | A1 * | 2/2003 | Crosby et al. ................... 707/3 |

FOREIGN PATENT DOCUMENTS

JP 2000-20588 A 1/2000

(Continued)

OTHER PUBLICATIONS

Boumans, Roelof, et al., "Modeling the dynamics of the integrated earth system and the value of global ecosystem services using the Gumbo model", *Ecological Economics*, vol. 41, (2002), 529-560.

(Continued)

*Primary Examiner*—F. Ryan Zeender
*Assistant Examiner*—Mussa Shaawat
(74) *Attorney, Agent, or Firm*—Schwegman, Lundberg & Woessner, P.A.

(57) ABSTRACT

A method and system for calculating an environmental score are described and generally related to calculating a score for a separately accountable business unit, where the score is indicative of external costs for the business unit. A computer system for calculating a score for a separately accountable business unit, the score being indicative of a level of unaccounted for external environmental cost of economic activities of the separately accountable business unit, the system includes accessing means for accessing accounts data indicative of recognized costs for the separately accountable business unit, accounts processing means for processing the accounts data by adding external environmental costs to the recognized costs and for calculating the score for the separately accountable business unit using the processed accounts data.

16 Claims, 4 Drawing Sheets

FOREIGN PATENT DOCUMENTS

| | | |
|---|---|---|
| JP | 2001-167194 A | 6/2001 |
| WO | WO-9811493 A1 | 3/1998 |

OTHER PUBLICATIONS

Sieniutycz, Stanislaw, "Variational Approach to Available Energy and Thermodynamics of Evolution in Ecological Systems", *International Workshop on Complex Systems in Natural and Social Sciences (CSSNS 2001)*, Torun, Poland, Facility of Chemical and Process Engineering, Warsaw University of Technology, (Oct. 18-21, 2001), 19 Pages.

"International Application Serial No. PCT/NZ97/00115, International Search Report mailed Dec. 23, 1997", 3 pgs.

"Japanese Application Serial No. 2003-550109, Office Action mailed Jul. 3, 2007", (w/ English Translation), 9 pgs.

"Japanese Application Serial No. 2003-550109, Response filed Dec. 27, 2007 to Office Action mailed Jul. 3, 2007", 10 pgs.

Andres, F., et al., "A Multi-Environment Cost Evaluator for Parallel Database Systems", *Database Systems for Advanced Applications* '91, 1991, 126-135.

Szargut, J., "Application of Energy for the Calculation of Ecological Cost", *Bulletin of the Polish Academy of Sciences - Technical Sciences*, 34 (No. 7-8), (1986), 475-480.

* cited by examiner

METHOD AND SYSTEM FOR CALCULATING AN ENVIRONMENTAL SCORE FOR A BUSINESS UNIT

RELATED APPLICATIONS

This application is a continuation under 35 U.S.C. 111(a) of PCT/GB01/05265, filed on Nov. 29, 2001 and published in English on Jun. 12, 2003 as WO 03/048986 A2, which application and publication are hereby incorporated by reference.

The present invention generally relates to method and system for calculating an environmental score. More specifically, the present invention relates to a method and system for calculating a score for a separately accountable business unit, where the score is indicative of external costs for the business unit.

Environmental issues are becoming increasingly important to companies, partly due to the fact that consumers and shareholders are demanding greater transparency and accountability, and partly in response to government regulation. Investor demand is evidenced by the launch of several indices that focus specifically on companies that are deemed sustainable. There are more than fifty retail ethical funds in the United Kingdom alone, and the value of these funds grew from £199 million in the second quarter of 1989 to £3.7 billion by the end of 2000. Further, UK pension legislation (as of 3 Jul. 2000) states that every Annual Report for trustees must include a statement of ethical principle, if any. This has led to the need for companies to consider their environmental impact.

A prior art technique for providing an ecological score is disclosed in WO98/11493. This technique is based on an assumption that the economic activity of a business unit, such as a company, can be environmentally sustainable and thus a score can be given to the company to rate the company between two extremes of unsustainable and sustainable. In order to determine the ecological score, the quantity of the inputs and outputs to the business are considered and these are assessed against three ecologically sustainable conditions. These are derived from the Natural Step principles. The inputs and outputs are multiplied by a factor that is either 0 or 1 dependent upon whether the inputs and outputs are assessed as meeting the Natural Step principles.

This technique is based on the premise that the economic activity of a business is sustainable. Sustainability has to be judged based on the qualification of these Natural Step principles.

It is an object of one aspect of the present invention to provide a method and system for calculating an environmental score for a separately accountable business unit that does not make any assumptions about environmental sustainability and uses an accounting method to generate a score taking into consideration the full costs of the economic activity for the business unit.

A first aspect of the present invention provides a method and system for calculating a score for a unit of economic activity for which accounts can be separably determined. The accounts for the unit indicate recognized or internal costs. The score for the unit is calculated by taking into consideration the full cost of the economic activity for the unit by adding external environmental costs to the internal costs.

In one embodiment of the present invention the score is calculated by talking the ratio of the internal (recognised) costs to the total costs that comprise the internal (recognised) costs plus the external environmental costs.

This embodiment of the present invention provides an incentive for a business to fully internalize all costs in order to increase the score for the business unit. If all costs are internalized and there are no external environmental costs, the business unit will attain a high score of 1 or 100%. If the economic activity of the business unit incurs a large external environmental cost compared to their internal or recognized costs, the business unit will attain a low score of near 0. The size of a companies score thus gives and indication of a companies economic environmental effect.

It is of great benefit to cause businesses to internalize costs to provide a greater transparency of the economic costs of their commercial activity.

The present invention can be used as a universally applicable business tool to be used by any type and size of economic organization for which separate financial data is available. For example, the business unit can comprise a company, partnership, person or charity. Within a business entity, the business unit can comprise a department or division of a business, a service or product, or a group of services or products. Thus the business unit can comprise any unit for which there is economic activity and for which separate accounts can be provided.

Thus the present invention provides a means by which a score can be provided for a business unit to recognise the overall environmental degradation caused by economic activity. This is reflected in the incorporation of external environmental costs into the determination of the score. The external environmental costs can represent the costs that people would be willing to pay for the product in order to preserve the environment. The external costs are costs that do not show up on the balance sheet for a company and they are termed external because although they are real costs to some members of society, firms do not normally take them into account in the running of their businesses.

The score determined in accordance with the present invention is determined using a technique that is independent of the business unit and can thus be used as a standard for the comparison of the environmental impact of the economic activity of business units. The score can also be used for information purposes, e.g. for the public and the shareholders. Further, the score can be used by companies as a tool by which their environmental performance over time can be compared.

The present invention evaluates financial reports for business units and takes into consideration unaccounted for external environmental costs to provide a score that is an indicator of the impact of the business unit on the environment.

In one embodiment of the present invention the recognised costs (internal costs) include costs and profit or loss for the separately accountable business unit. Thus in this embodiment of the present invention, the profitability of the business unit is taken into consideration in the determination of the score. Thus in this embodiment of the present invention the score gives an indication of 'eco-efficiency'.

The present invention can be used for any type of economic activity because common price units can be allocated to all inputs and outputs from the economic activities of the business unit. In this way the effect of different types of products and services (economic activity) is effectively weighted by the allocation of price to the activity. Thus the effect of different types of products and services (economic activity) is translated to a common factor, price in the determination of the economic score for the business unit.

In an embodiment of the present invention, the score can not only take into account the economic activity of the business unit, but also the economic activity of suppliers of the business unit. In this embodiment, scores for the suppliers are used in the calculation of the score for the business unit. The scores for the suppliers can be determined using the methodology of the present invention. In one embodiment, where insufficient information is available, the "precautionary principle" is used in the assignment of a score for a supplier in that a supplier is assigned a score indicating a maximum environmental impact or a high level of unaccounted for external environmental costs. The use of the precautionary principle encourages companies to require their suppliers to also attain a score that will be better than that provided by the precautionary principle since this will be favourably reflected in the score for the company.

In this embodiment of the present invention in which suppliers are also utilized, financial information for suppliers can be obtained from public information sources; i.e. published accounts for companies. If these accounts are not available, the precautionary principle will be applied to the supplier.

In one embodiment of the present invention, the system is provided as a subscription service whereby companies can subscribe to obtain a score. A company can supply financial data including information that identifies suppliers. A score can then be determined for the company or part of the company. If a supplier is also a subscriber to the service, then an accurate score will be available for them. If the supplier is not a subscriber, the system can access the public accounts for the company in order to calculate a score for the supplier. If the accounts are not available, using the precautionary principle, a score is attributed to the supplier that indicates a high level of unaccounted for external environmental costs.

Thus, in accordance with this embodiment of the present invention, as more companies subscribe to the service, the system becomes more accurate since more companies having interrelationships have an accurately determined score.

The external environmental costs for a business unit can be calculated as a function of the economic inputs and economic outputs of the business unit. For example, the external environmental costs can be determined for the economic inputs as a function of the recognized costs for the economic inputs and external environmental costs for the economic outputs can be determined as a function of the recognized costs for the economic output. This can be calculated by weighting the economic inputs by an 'environmental input cost weight' and weighting the economic outputs by an 'environmental output cost weight'.

The present invention can be implemented over computer networks such as the Internet to provide a web interface. This allows companies to access the service hosted on a web server using a web browser, for example. In accordance with this embodiment of the present invention, the company wishing to obtain a score can upload accounts information over the network to the server to allow the score to be calculated.

One aspect of the present invention provides a method of managing a separately accountable business unit by comparing a score determined using the method for a business unit for a period of time with another score determined using the method for another business unit for the same period of time or for the same business unit for another period of time. The business unit is managed in accordance with the result of the comparison.

Another aspect of the present invention provides a fund management method in which scores determined using the method for a plurality of companies are compared and funds are managed using the result of the comparison.

This aspect of the present invention enables fund or investment managers to compare the environmental performance of companies during their management activities. Investment managers are under pressure to take environmental factors into account due to regulatory and other pressures for environmental and ethically considered investments. The provision of a simple quantitative comparison of environmental performance by the score facilitates such a methodology.

Another aspect of the present invention provides a solution to the problem of determining a score for a company when accounts data for suppliers used in the determination of the score may or may not be available. In this aspect of the present invention a method and system is provided for calculating a score for a separately accountable business unit. The score is indicative of a level of unaccounted for external environmental cost of economic activities of the business unit. A store is provided for storing accounts data and scores for suppliers. The scores are indicative of a level of unaccounted for external environmental cost of economic activities of the suppliers. Accounts data indicative of recognized costs for the separately accountable business unit and data identifying suppliers of products or services to the separately accountable business unit is received, e.g. over a network, from the business unit, or from a storage device. It is then determined whether there are scores stored for the identified suppliers. If not, public accounts data for the suppliers is accessed and retrieved over a communications network. Scores for suppliers are then calculated using the retrieved public accounts data. A score for the separately accountable business unit can then be calculated using the received accounts data for the separately accountable business unit and the score for the suppliers of the separately accountable business unit, where the scores are either retrieved where available or calculated where necessary.

This aspect of the present invention provides a solution to the technical problem of how to generate a score for a company when a score for a supplier is not available. Public accounts data is accessed over a communications network to enable a score to be calculated for the suppliers and therefore for the business unit.

The present invention can be implemented in hardware or in software. The present invention thus encompasses a carrier medium carrying computer readable code for implementing the method. The carrier medium can comprise a storage medium such as a floppy disk, hard disk, CD-ROM, magnetic tape device, or programmable solid state memory device. Further, the carrier medium can comprise a transient medium such as an electrical, optical, electromagnetic, or acoustic signal. For example, a carrier medium can comprise a signal carrying computer code over a network such as the Internet.

The present invention will now be described with reference to the accompanying drawings in which.

Figure 1:
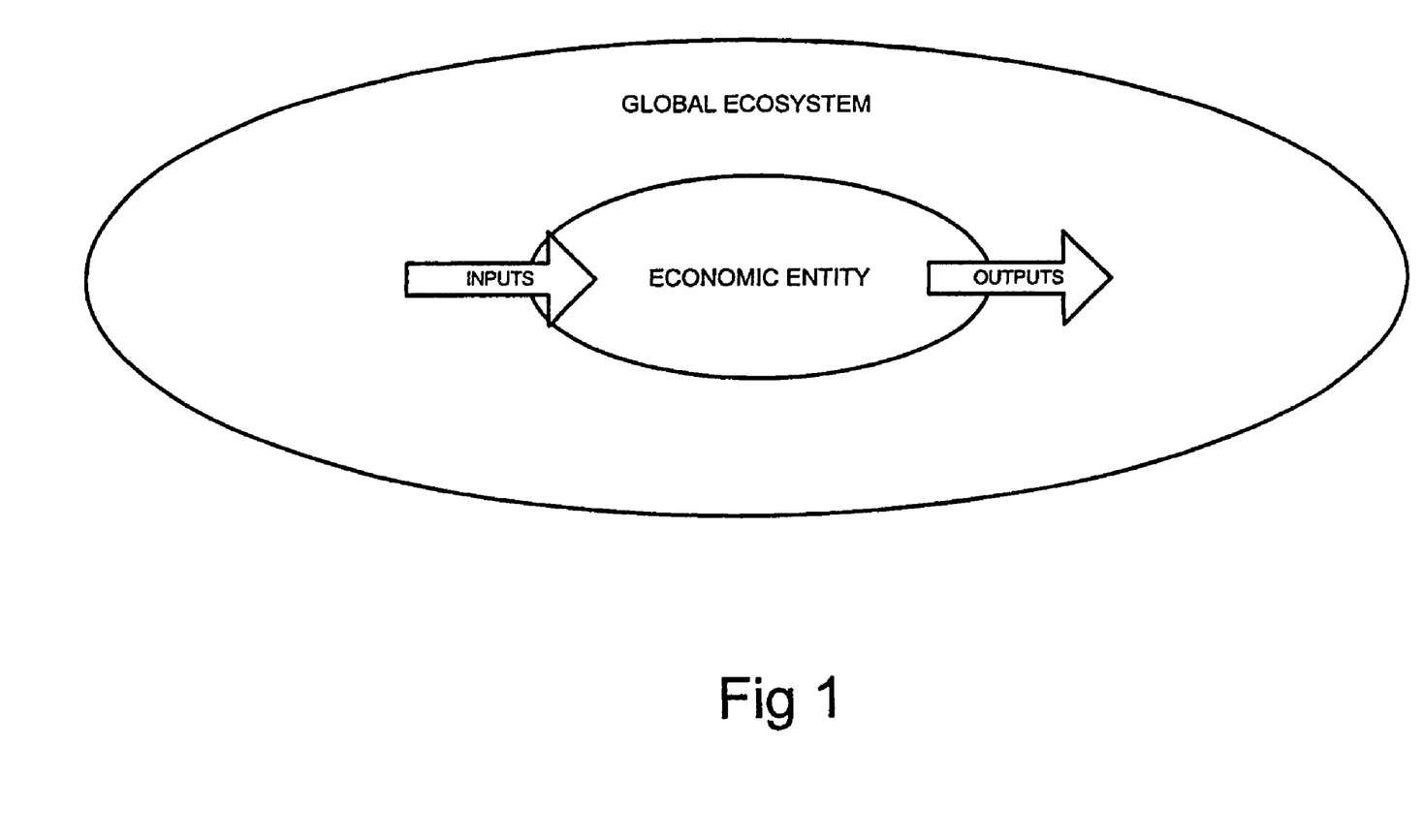
FIG. 1 is a schematic diagram illustrating the relationship between the economic activity of a business unit and the global environment.

FIG. 1 illustrates the principles of the model used in the present invention. An economic entity such as a company, partnership, charity or person carries out an economic enterprise in which the economic activity within the global eco-system takes inputs from the global eco-system and generates outputs. The inputs to economic activity can be termed as the source function of the global ecosystem and the outputs of economic activity consume the sink function of the global ecosystem. Examples of the source function are natural resources taken from the earth, such as coal oil, timber, water and fish. Examples of the sink function comprise the use of natal resources to absorb waste and recycle nutrients. Together these two functions allow economic activity to exist.

Accounting methods used currently by economic entities do not take into account the Source and Sink function s that are not recognised costs in the balance sheet. The present invention takes into account these external costs in the determination of a score for the economic entity. In one embodiment the score is the ratio of the recognized costs over the total costs, i.e.

$$\text{Score} = \frac{\text{Recognised Costs}}{\text{Recognised Costs} + \text{External Environmental Costs}}$$

The economic costs for an entity are determined as the external costs that do not appear on the balance sheet or financial data for the economic entity. Thus the score provides an indication of the unaccounted for hidden costs to the economy of the economic activity of the economic entity. By penalising an economic entity, by way of an unfavourable score, the economic entity is encouraged to internalize the environmental costs, i.e. by making an allowance for these costs in the balance sheet. For example, if the economic entity is a mining company, the internalization of costs may take the form of making a provision for restoration of the mining site (or the payment of an environmental levy such as the aggregate tax currently employed in the UK). This provision in the accounts would reduce the external environmental costs and bring a higher cost to the balance sheet as a recognised cost. In this way the score for the company would improve, i.e. in this example increase. The benefit of this is that the effect of the economic activity of the company on the environment becomes visible in the company accounts. This pushes a company to operate in a more sustainable manner where possible, and if not possible, e.g. in the case of mining, it at least ensures that the true cost of the economic activity of the company is recognized and articulated in the score.

Thus in order to calculate a score for an economic entity, it is necessary to evaluate the financial reports for the economic entity (business unit).

Since the economic entity does not operate independently within the global eco-system, i.e. suppliers of products and services are used in the economic activity of the economic entity, the model incorporates a factor to take into account the environmental impact of suppliers. In order to do this, the suppliers are also assigned scores which are used in the calculation of the score for the economic entity. The scores for the suppliers can similarly be calculated in dependence upon scores for their suppliers. Thus in this way upstream external environmental costs in the economic supply chain are incorporated into the score calculation. Thus the score provides an indication of the impact of the economic entity and their suppliers on the environment and provides a complete and aggregated view of the economic activity of the organization from the bottom of its supply chain right through to its final output. A breakdown of the aggregated score is also made available to participants. This breakdown enables guidance to the participant in improving the score.

The present invention is particularly advantageous since it simply requires financial information from companies in order to enable the calculation of the environmental score. The service provider performing the score calculation can attribute external environmental costs in accordance with known techniques, as will be described in more detail hereinafter.

Since the score is generated through the evaluation of the economic activities of an organization and its suppliers, all organizations are evaluated in the same manner and according to the same criteria.

Since financial data for the business entity is used in the determination of the score, all activities of the business entity can be identified and are quantified. This enables all inputs and outputs involved in an organization's economic activity to be included in the calculation of the score.

In an embodiment of the present invention, the score aggregates all inputs and outputs into a value which ranges between 0% and 100%, where 100% represents the full internalization of external environmental costs associates with an organization's economic activities.

Since financial data is used as the basis for the calculation of the score, a score can be calculated for any economic unit or business unit for which there are separate accounts. For instance, the economic unit can comprise a business such as a company, partnership, charity or person. Alternatively, it can comprise a section of the business such as a department or division. Further, it can comprise a product or process or groups of products and process such as product lines for which accounts can be separated.

The calculation of the score for the economic entities uses financial data and thus the use of a common unit of price for inputs and outputs has the effect of weighting their economic and environmental significance relative to each other. Further, since the score, in one embodiment, is determined as ratio of recognized costs to actual costs, the price unit used should be the same price unit for the determination of the score for a business entity but need not be the same price unit for calculation of scores for different business entities. Thus, for example, if two companies produce their accounts in different currencies, e.g. Dollars and Pounds Sterling, the scores calculated for these two companies can still be compared since the price units cancel out in the calculation of the scores.

Where market prices are not available for determining costs of inputs and outputs, a range of economic techniques can be consistently employed to establish appropriate costs.

The external environmental costs can be direct, resulting from a company's own activities, or indirect, stemming from the company's suppliers. It is the accumulation of these external environmental costs that is responsible for the decline in the ability of the world's eco-systems to provide essential goods and services. These costs must be recognized and internalised—a prerequisite for companies to move (align) towards environmentally sustainable development.

Within the calculation of the score, the scores for suppliers are taken into consideration. Scores for suppliers can be calculated using the method of the invention where financial data is available. If financial data is not available, using the precautionary principle, a score of 0 indicating a high degree of external costs is assigned to the supplier.

In one embodiment the score can provide an indication of eco-efficiency by including profit/loss in the calculations. In this embodiment the score is determined by including the profit/loss in the recognized costs. Thus, in this embodiment of the present invention, for a same level of costs, if a company is highly profitable, assuming the same level of external environmental costs, the profitable company's score will be higher. Thus the score in this embodiment takes economic factors, not just environmental factors, into account. Where a company is making a profit, this indicates that there is a willingness to pay for the product. The score thus gives an indication of economic and environmental sustainability.

The external environmental costs used in the calculation of the score for an economic entity can be calculated using known techniques. One technique that will be described hereinafter with reference to the specific embodiment of FIG. 2, uses input and output weighting factors applied to the inputs and outputs of the economic activities of the economic entity.

There are many known conventional economic techniques for calculating external environmental costs. For example, external environmental costs can comprise:

1. Avoidance costs—costs that would have been incurred in the absence of eco-system services (e.g. flood control avoids property damage);

2. Replacement costs—eco-system services could be replaced with manmade systems (e.g. waste treatment plants for natural waste treatment);

3. Factor income—eco-system services provide for the enhancement of incomes (e.g. water quality improvements increase commercial fisheries);

4. Travel costs—enjoying eco-system services may require travel, whose costs reflect the implied value of the service;

5. Hedonic pricing—eco-system services may require travel, whose costs can reflect the implied value of the service;

6. Contingent valuation—hypothetical scenarios that involve some valuation of alternatives (e.g. people would be willing to pay for an increased fish catch).

Other possible methods for the calculation of external environmental costs are:

1. Global economy—global ecosystem cross-correlation;

2. Economic sector—ecosystem service cross-correlation.

Such methods have been reviewed by the European Union (CON (94) 607 Final, June 1996) and are pursued by the EU's Eurostat Pressure Index Project.

In addition where appropriate Global Unified Metamodels of the Biosphere as developed by Boumans et al. can be used to develop the aforementioned weightings. This is disclosed in a draft article entitled "Modelling the Dynamics of the Integrated Earth System and the Value of Global Ecosystem Services Using the GUMBO model" by Roelof Boumans, Robert Costanza, Joshua Farley, Rosimery Portela, Ferdinando Villa, and Mathew A. of the Wilson Institute for Ecological Economics, University of Maryland, Box 38, Solomons, Md. 20688, USA.

Figure 2:
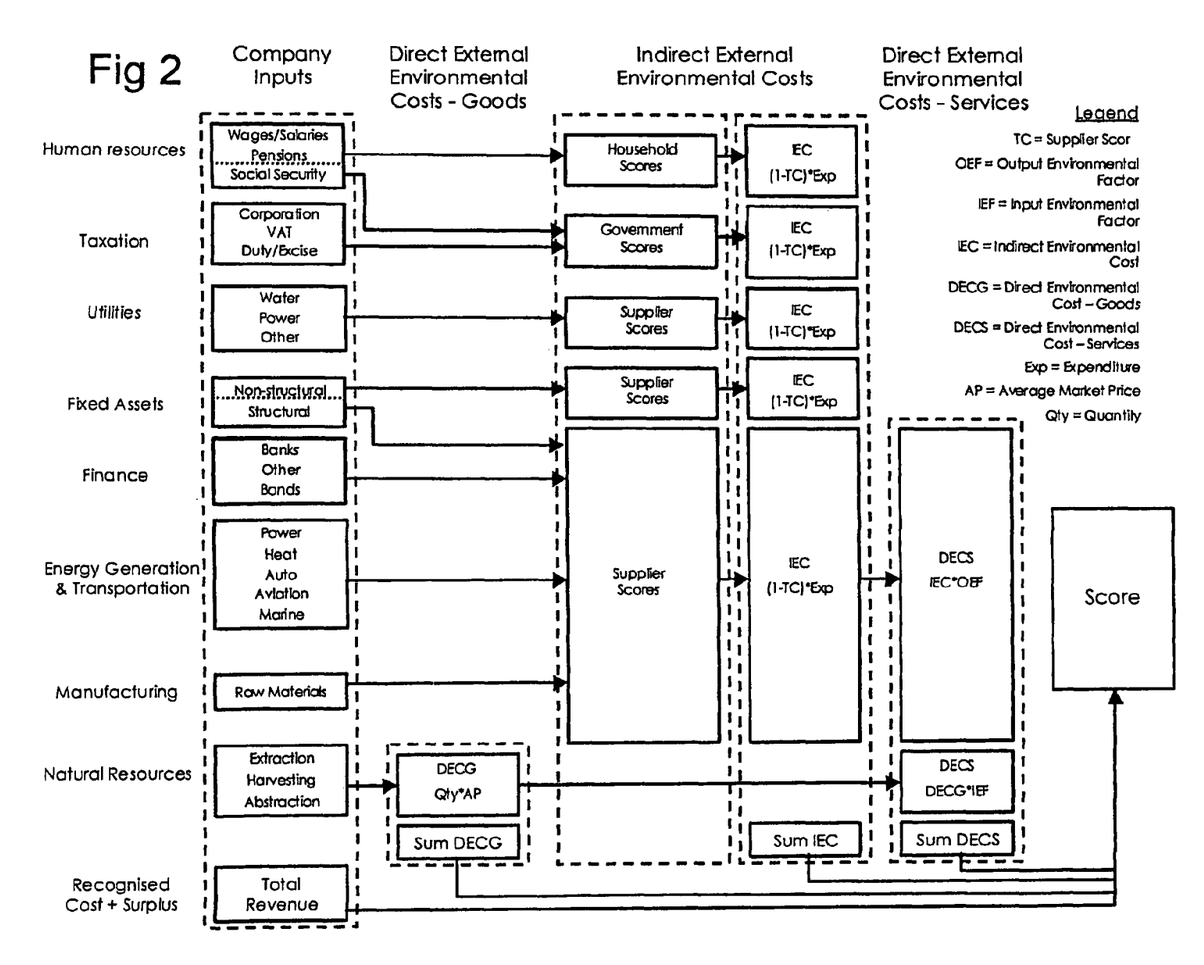
FIG. 2 is a schematic diagram of the methodology in accordance with one aspect of the present invention.

The specific embodiment of the present invention will now be described with reference to FIG. 2. In this embodiment of the present invention, a specific method of calculating external environmental costs to enable the calculation of a score is used.

In this method an organization's activities are divided into a number of categories including human resources, natural resources, manufacturing, energy generation including transportation, utilities, finance and taxation. Also, information is obtained on the organization's fixed assets. The financial data further provides recognized costs and profit/loss. These comprise the information for the company (company inputs). Costs are associated with each of these inputs and the costs are used in the calculation of a score.

The recognized costs and the profit/loss comprise the total revenue which is used directly in the calculation of the score as will be described in more detail hereinafter. Natural resources comprise three types, extracted, harvested and abstracted. These all comprise resources taken directly from the environment. The quantity taken is multiplied by an average market price to provide a direct external environmental cost for goods (DECG). This is used in the calculation of the score as will be described in more detail hereinafter. The direct external environmental cost for goods is then multiplied by an input environmental factor (IEF) to determine the contribution to the direct external environmental cost for the ecosystem services. The input environmental factor comprises a weighting factor to be applied in dependence upon the degree of sustainable use of natural resources, e.g. the degree of sustainable extraction, harvesting and abstraction. The contribution to the direct external environmental cost for the services contributed by the use of the natural resources is summed with the direct external environmental costs for the services calculated for the outputs of the economic activity of the company. The generation of the direct external environmental costs for the services (DECS) as a contribution due to the outputs of the company will now be described.

The economic activity of the company uses human resources, utilities, fixed assets, finance, energy generation including transportation, manufacturing, taxation and finance. Human resources comprise two components, wages/salaries and pensions, and social security. There is an indirect external environmental cost associated with this which would depend upon household scores which are input to generate an indirect external environmental cost associated with wages/salaries and pensions which comprises the expenditure on wages/salaries and pensions weighted by the household scores. The taxation inputs for a company comprise corporate tax, VAT, and duty/excise. A contribution to the indirect environmental costs attributed to government effected company inputs can be calculated by weighting the expenditure on social security costs and taxation using a score for the government—entitled the Government Score. An indirect external environmental cost attributable to utilities is calculated by taking the expenditure of the company for utilities such as water, power and gas and weighting with the suppliers' scores. An indirect external environmental cost associated with depreciation of non-structural and structural fixed assets are calculated by taking the costs (annual depreciation charge) of the non-structural and structural fixed assets and multiplying them by a score. Similarly, an indirect external environmental cost contribution for finance (banks, bonds, etc.) energy generation (power, heat, auto, aviation and marine) and manufacturing (raw materials costs) is determined by taking the costs for these materials and weighting them by suppliers' scores. A sum of the indirect external environmental costs is taken and used in the calculation of the score. Also, the direct environmental costs for services for outputs are calculated by weighting the indirect external environmental costs determined for structural fixed assets energy generation and manufacturing, and this is weighted by an output environmental factor to take into account the environmental costs of consuming the sink function of the company's economic activities. The total direct external environmental costs for the services is then calculated and used in the calculation of the score.

The score is calculated using the following equation:

$$\text{Score} = \frac{RC}{(RC + DECG + DECS + IEC)}$$

where:

RC (recognized costs) is the total operating costs plus any profits/loss taken from the annual accounts DECG (direct external environmental costs of goods) is the total amount of goods extracted or harvested multiplied by an average market price for the goods DECS (direct external environmental costs of services) accounts for the services consumed in the provision of the aforementioned good in addition to the discharge or output quantities as a result of the economic activity of the company IEC (indirect external environmental costs) is the expenditure on third party suppliers weighted by the supplier's score. This incorporates the environmental impact of outsourced goods and services.

Some examples of different types of companies will now be described to illustrate how the score varies for different types of companies. The following five different types of companies will be considered:

1. An Extractor
2. A 'Sustainable Harvester'
3. An Oil Company
   (Vertically integrated, therefore operating at the primary extractor level and manufacturing level)
4. Manufacturer of Plastics
5. High Street Retailer The same central cost base is employed for all examples:

| Resource Category | Sub Category | Sub Category | Price Units |
|---|---|---|---|
| Natural | | | Specific to Example |
| Human | | | 1000 |
| Manufactured | Fixed Assets | Structural | 500 |
| Manufactured | Fixed Asset | Non Structural | 300 |
| Manufactured | Non Fixed Assets | Matter | 2000 |
| Manufactured | Non Fixed Assets | Energy | 1500 |
| Finance Taxation | | | 1000 |

EXAMPLE 1

The Extractor

The Extractor extracts 1000 tonnes of coal:
The established price per tonne of coal—£6/tonne

| Resource Category | Recognised Cost (RC) | Supplier Score (ST) | Indirect External Environmental Cost (=RC × (1 − ST)) | Direct External Environmental Cost (Good) | Direct External Environmental Cost (Service) |
|---|---|---|---|---|---|
| Natural | 0 | 0 | 0 | 1000 × 6 = 6000 | 6000 × IEF<br>6000 × 4.5<br>27000 |
| Human | 1000 | 0.42 | 1000 × 0.58<br>580 | 0 | 0 |
| Manufactured Structural FA | 500 | 0 | 500 | 0 | 500 × IEF<br>500 × 4.5<br>2250 |
| Manufactured Non Structural FA | 300 | 0 | 300 | 0 | 0 |
| Manufactured Matter (The extractor is NOT involved in material transformations) | 2000 | 0 | 2000 | 0 | 0 |
| Manufactured Energy | 1500 | 0 | 1500 | 0 | 1500 × OEF<br>1500 × 4.5<br>6750 |
| Finance & Taxation Of which 200 constitutes an environmental extraction levy | 1000 | 0 | 1000 | 0 | 0 |
| Totals: | 6300 | | 5800 | 6000 | 36,000 |

The Score for the Extractor $$\text{Score} = \frac{RC}{(RC + DECG + DECS + IEC)}$$

$$= \frac{6300}{6300 + 6000 + 36000 + 5800}$$

$$= \frac{6300}{54100}$$

$$= 11.66\%$$

Obviously if the Profit/Loss was included, a profit would improve the score and a loss would decrease score In addition if as outlined 200 price units of the 1000 price units on tax is an environmental levy that was accepted by the standards authority for the scheme, the number of external environmental costs would be reduced by 200 price units and the resulting score would become:

$$\text{score} = \frac{6300}{53900}$$

$$= 11.7\%$$

Note the organisation is NOT involved in any material transformations, only the transformation of energy hence the OEF (output environmental factor) being applied to the energy expenditures as opposed to the material transformations.

EXAMPLE 2

The 'Sustainable' Harvester

The farmer harvests 1000 tonnes of wheat:
The established price per tonne of wheat—£4/tonne

| Resource Category | Recognised Cost (RC) | Supplier Score (ST) | Indirect External Environmental Cost (=RC × (1 − ST)) | Direct External Environmental Cost (Good) | Direct External Environmental Cost (Service) |
|---|---|---|---|---|---|
| Natural | 0 | 0 | 0 | 1000 × 4 = 4000 | 0 |
| Human | 1000 | 0.42 | 1000 × 0.58 580 | 0 | 0 |
| Manufactured Structural FA | 500 | 0 | 500 | 0 | 500 × IEF 500 × 4.5 2250 |
| Manufactured Non Structural FA | 300 | 0 | 300 | 0 | 0 |
| Manufactured Matter (The extractor is NOT involved in material transformations) | 2000 | 0 | 2000 | 0 | 0 |
| Manufactured Energy | 1500 | 0 | 1500 | 0 | 1500 × OEF 1500 × 4.5 6750 |
| Finance & Taxation Of which 200 constitutes an environmental extraction levy | 1000 | 0 | 1000 | 0 | 0 |
| Totals: | 6300 | | 5800 | 4000 | 9000 |

The Score for the Sustainable Harvester $$\text{score} = \frac{RC}{(RC + DECG + DECS + IEC)}$$

$$= \frac{6300}{6300 + 4000 + 9000 + 5800}$$

$$= \frac{6300}{25,100}$$

$$= 25.11\%$$

Obviously if the Profit/Loss was included, a profit would improve the score and a loss would decrease score Note the evidence of a sustainable management plan submitted to the schemes administrators indicates that in the course of the harvest the ecosystem services are not consumed and depleted—rather borrowed.

Note the organisation is NOT involved in any material transformations, only the transformation of energy hence the OEF (output environmental factor) being applied to the energy expenditures as opposed to the material transformations.

EXAMPLE 3

The Oil Company

The oil company extracts 1000 barrels of oil:
The established price per barrel of oil—£10/barrel

| Resource Category | Recognised Cost (RC) | Supplier Score (ST) | Indirect External Environmental Cost (=RC × (1 − ST)) | Direct External Environmental Cost (Good) | Direct External Environmental Cost (Service) |
|---|---|---|---|---|---|
| Natural | 0 | 0 | 0 | 1000 × 10 = 10000 | 10000 × IEF<br>10000 × 4.5<br>45000 |
| Human | 1000 | 0.42 | 1000 × 0.58<br>580 | 0 | 0 |
| Manufactured Structural FA | 500 | 0 | 500 | 0 | 500 × IEF<br>500 × 4.5<br>2250 |
| Manufactured Non Structural FA | 300 | 0 | 300 | 0 | 0 |
| Manufactured Matter (The extractor is NOT involved in material transformations) | 2000 | 0 | 2000 | 0 | 2000 × OEF<br>2000 × 4.5<br>9000 |
| Manufactured Energy | 1500 | 0 | 1500 | 0 | 1500 × OEF<br>1500 × 4.5<br>6750 |
| Finance & Taxation Of which 200 constitutes an environmental extraction levy | 1000 | 0 | 1000 | 0 | 0 |
| Totals: | 6300 | | 5800 | 10000 | 63000 |

The Score for the Oil Company $$Score = \frac{RC}{(RC + DECG + DECS + IEC)}$$

$$= \frac{6300}{6300 + 10000 + 63000 + 5800}$$

$$= \frac{6300}{85,100}$$

$$= 7.4\%$$

Obviously the Profit/Loss was included, a profit would improve the score and a loss would decrease score.

Note the organisation is involved in material and energy transformations hence the OEF (output environmental factor) is applied to the energy and material expenditures.

In addition if as outlined 200 price units of the 1000 price units on tax is an environmental levy that was accepted by the standards authority the number of external environmental costs would be reduced by 200 price units and the resulting score would become:

$$score = \frac{6300}{84,900}$$

$$= 7.42\%$$

EXAMPLE 4

The Plastics Manufacturer

| Resource Category | Recognised Cost (RC) | Supplier Trucost ® (ST) | Indirect External Environmental Cost (=RC × (1 − ST)) | Direct External Environmental Cost (Good) | Direct External Environmental Cost (Service) |
|---|---|---|---|---|---|
| Natural | 0 | 0 | 0 | 0 | 0 |
| Human | 1000 | 0.42 | 1000 × 0.58<br>580 | 0 | 0 |
| Manufactured Structural FA | 500 | 0 | 500 | 0 | 500 × IEF<br>500 × 4.5<br>2250 |

| Resource Category | Recognised Cost (RC) | Supplier Trucost ® (ST) | Indirect External Environmental Cost (=RC × (1 − ST)) | Direct External Environmental Cost (Good) | Direct External Environmental Cost (Service) |
|---|---|---|---|---|---|
| Manufactured Non Structural FA | 300 | 0 | 300 | 0 | 0 |
| Manufactured Matter (The extractor is NOT involved in material transformations) | 2000 | 0 | 2000 | 0 | 2000 × OEF 2000 × 4.5 9000 |
| Manufactured Energy | 1500 | 0 | 1500 | 0 | 1500 × OEF 1500 × 4.5 6750 |
| Finance & Taxation Of which 200 constitutes an environmental extraction levy | 1000 | 0 | 1000 | 0 | 0 |
| Totals: | 6300 | | 5800 | 0 | 18000 |

The Score for the Plastics Manufacturer $$\text{Score} = \frac{RC}{RC + DECG + DECS + IEC}$$
$$= \frac{6300}{6300 + 0 + 18000 + 5800}$$
$$= \frac{6300}{30,100}$$
$$= 20.93\%$$

Obviously if the Profit/Loss is included, a profit would improve the score and a loss would decrease score.

Note the organisation is involved in material and energy transformations hence the OEF (output environmental factor) is applied to the energy and material expenditures.

EXAMPLE 5

The High Street Retailer

No operation at the primary level.
No material transformations.
Only energy transformations.

| Resource Category | Recognised Cost (RC) | Supplier Trucost ® (ST) | Indirect External Environmental Cost (=RC × (1 − ST)) | Direct External Environmental Cost (Good) | Direct External Environmental Cost (Service) |
|---|---|---|---|---|---|
| Natural | 0 | 0 | 0 | 0 | 0 |
| Human | 1000 | 0.42 | 1000 × 0.58 580 | 0 | 0 |
| Manufactured Structural FA | 500 | 0 | 500 | 0 | 500 × IEF 500 × 4.5 2250 |
| Manufactured Non Structural FA | 300 | 0 | 300 | 0 | 0 |
| Manufactured Matter (The extractor is NOT involved in material transformations) | 2000 | 0 | 2000 | 0 | 0 |
| Manufactured Energy | 1500 | 0 | 1500 | 0 | 1500 × OEF 1500 × 4.5 6750 |

-continued

| Resource Category | Recognised Cost (RC) | Supplier Trucost ® (ST) | Indirect External Environmental Cost (=RC × (1 − ST)) | Direct External Environmental Cost (Good) | Direct External Environmental Cost (Service) |
|---|---|---|---|---|---|
| Finance & Taxation Of which 200 constitutes an environmental extraction levy | 1000 | 0 | 1000 | 0 | 0 |
| Totals: | 6300 | | 5800 | 0 | 9000 |

The Score for the High Street Retailer $$\text{Score} = \frac{RC}{(RC + DECG + DECS + IEC)}$$
$$= \frac{6300}{6300 + 0 + 9000 + 5800}$$
$$= \frac{6300}{21,110}$$
$$= 29.84\%$$

Obviously if the Profit/Loss is included, a profit would improve the score and a loss would decrease score.

Note the organisation is involved only in energy transformations hence the OEF (output environmental factor) is applied to the energy expenditure.

| Summary | | |
|---|---|---|
| Example | Nature | Trucost |
| 1 | Extractor | 11.66 |
| 2 | Sustainable Harvester | 25.11 |
| 3 | Oil Company | 7.4 |
| 4 | Plastic Manufacturer | 20.93 |
| 5 | Retailer | 29.84 |

Figure 3:
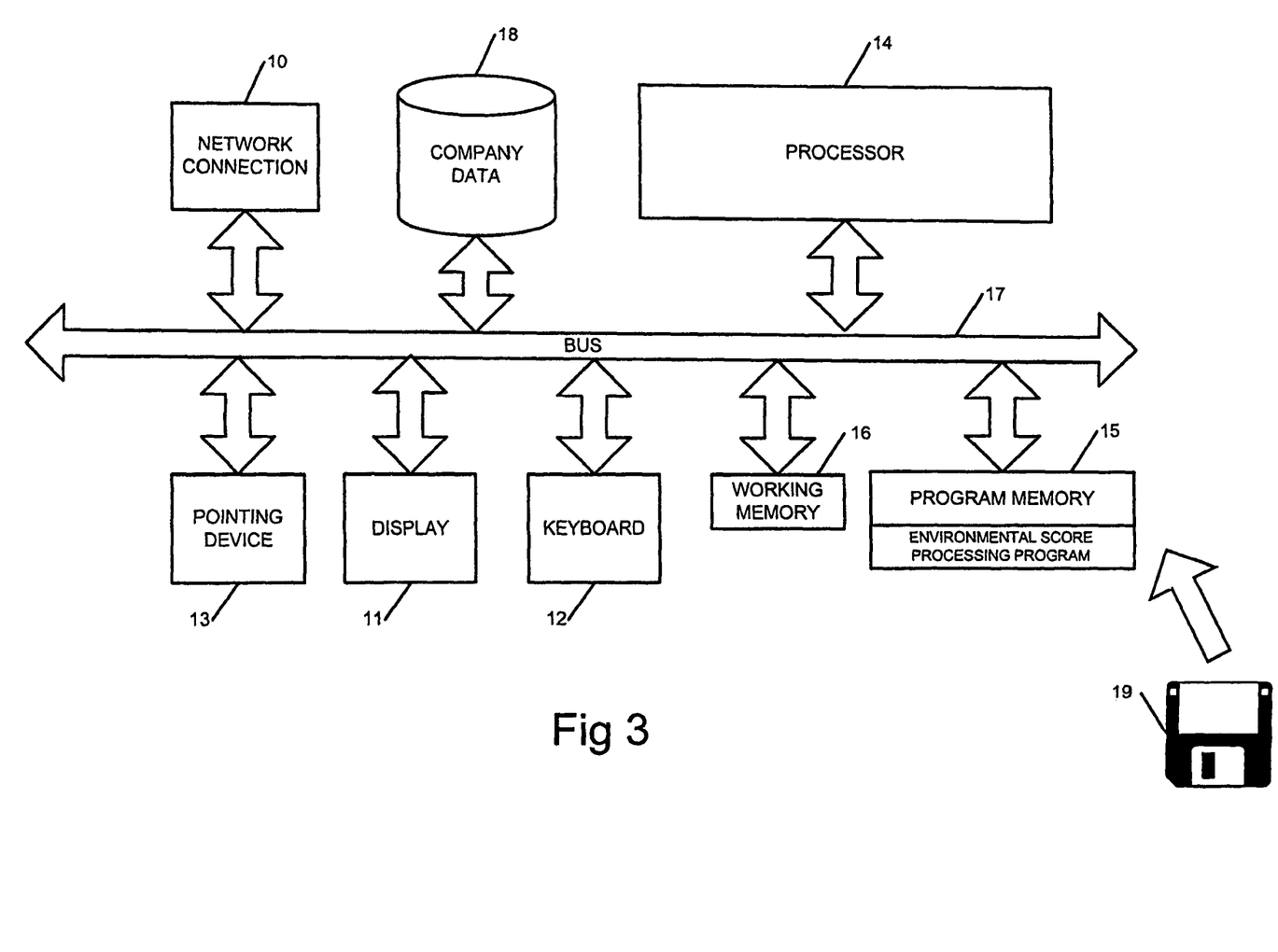
FIG. 3 is a schematic diagram of a processing system implementing the method in accordance with one embodiment of the present invention.

The methodology of the present invention can be implemented on a stand-alone computer system as illustrated in FIG. 3. A computer system comprises a conventional computer that includes a network connection device such as a modem or local area network (LAN) card 10. A pointing device such as a mouse 13 is provided together with a display 11 and keyboard 12. A database 18 is provided storing company data that comprises data on companies subscribing to the service to obtain an environmental score. The company data can include financial data and data identifying suppliers to the company. For non-subscribing companies that are suppliers, the company data 18 can comprise published accounts data for the supplier company to be used in the calculation of the score for the company so that this can be used in the determination of the score for the subscribing company in a manner as described with reference to the methodology of FIG. 2.

A processor 14 is provided for implementing an environmental score processing program stored in a program memory 15. The program memory 15 can comprise any suitable medium storing computer code for execution by the processor 14. During the execution of the program, the program memory 15 can comprise volatile memory. In order to execute the program, the environmental score processing program can be loaded into the volatile program memory 15 from any suitable non-volatile storage medium, e.g. a hard disk drive. The environmental score processing program can be provided to the computer system using any suitable carrier medium such as a floppy disk 19.

A computer system also includes a working memory 16 comprising conventional RAM for use by the processor 14 during the execution of the environmental score processing program.

Thus, in accordance with this embodiment of the present invention, when a business entity subscribes to the service to be provided with an environmental score, they provide financial accounts data that is loaded into the company data stored in the database 18. They also provide information identifying their suppliers. Using this data the processor 14 executes the environmental score processing program to implement the methodology illustrated in FIG. 2. In order to do this, supplier score information is required. Where financial information for suppliers is available, this is used to calculate a score for the suppliers. The financial information for suppliers can be obtained from published accounts data, e.g. from Companies House in the United Kingdom. If accounts data is not available for the suppliers, using the precautionary principle, a penalising score is assigned to the supplier, i.e. TC=0. Identification of the suppliers can be determined automatically from the purchase ledger information in the accounts data.

The database 18 thus stores scores for subscribing companies together with their accounts data. It can also store published accounts for non-subscribing companies who are suppliers of subscribing companies. It can further store any calculated scores for the non-subscribing supplier companies.

Figure 4:
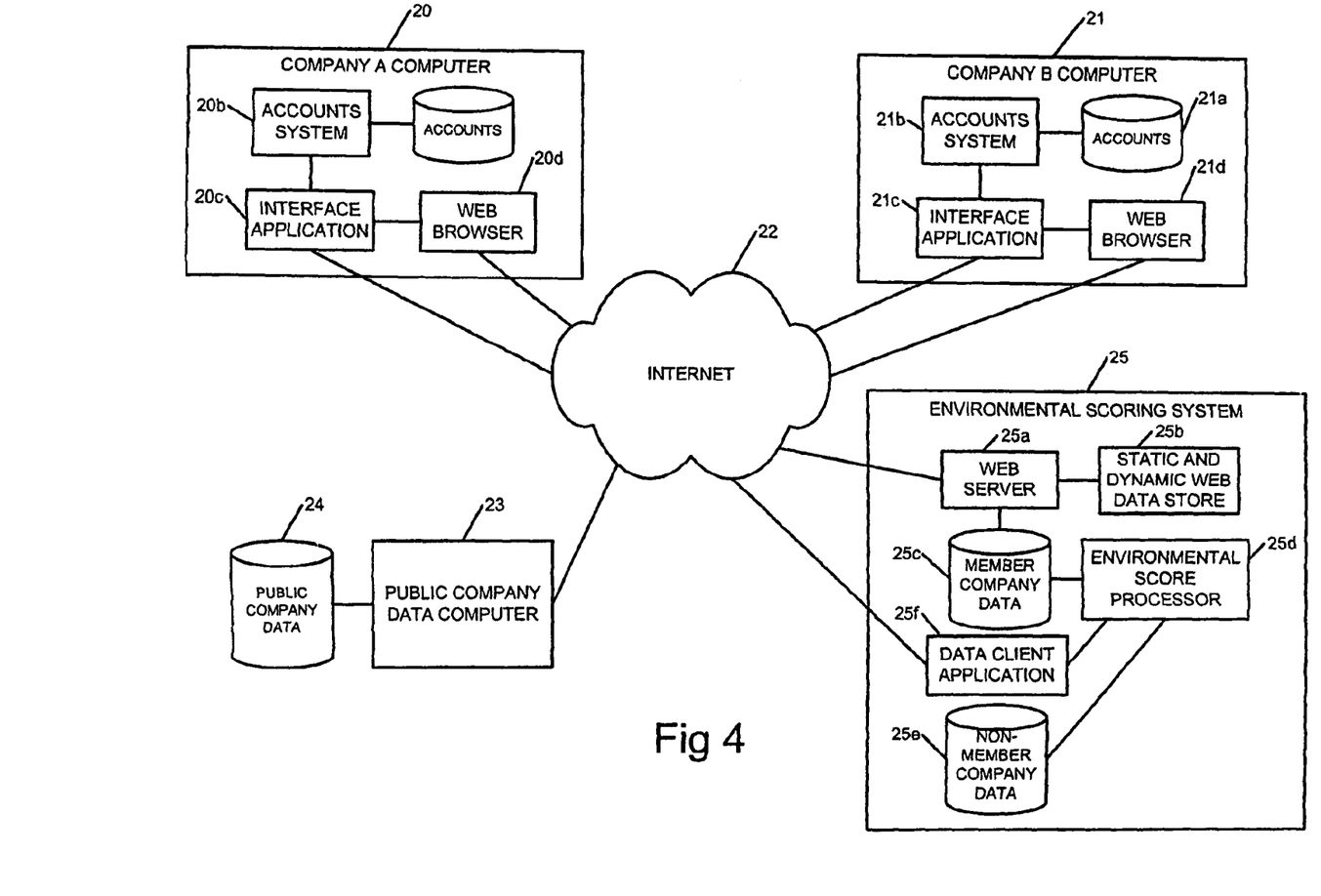
FIG. 4 is a schematic diagram of a networked system for implementing the method in accordance with one embodiment of the present invention.

FIG. 4 illustrates an alternative embodiment of the present invention that is implemented over a network such as the Internet. In this embodiment of the present invention, an environmental scoring system 25 operates in a similar manner to the computer system illustrated in FIG. 3. The system operates over the Internet 22 using any Internet protocol, such as the http protocol. A company wishing to subscribe uses a computer 20 or 21 on which is held their accounts data 20a. The computer 20 or 21 includes a web browser 20d or 21d that is used to access a web server 25a at the environmental scoring system 25 over the Internet 22. The web server 25a provides web pages using static and dynamic web data stored in a store 25b. The computers 20 or 21 are provided with an interface application 20c or 21c that can be downloaded over the Internet. The interface application 20c or 21c interfaces to the company's accounts system 20b, 21b to access the accounts 20a or 21a to upload the accounts data to the web server 25a to be stored in a database of member company data 25c. Thus, when a company subscribes to the service, they can download an interface application to allow accounts data to be uploaded into the database 25c. An environmental score processor 25d at the environmental scoring system 25 can then access the member company data 25c to generate a score for the company. Where the company data identifies suppliers, the environmental score processor 25d can access non-member company data in a database 25e to determine whether there is a score stored for the non-member company. If not, the environmental score processor 25d can control the data client application 25f to use the Internet 22 to access a public company data computer 23 to provide access to public company data in a database 24. The public company data computer 23 can comprise, for example, Companies House in the United Kingdom to provide access to published account data for companies. This is thus retrieved by the environmental score processor 25d to allow it to calculate a score for the supplier and store the score in a non-member company database 25e. In this way the environmental score processor 25d can either look up the scores for suppliers or, if a score is not present, retrieve the necessary published accounts for the supplier company and calculate a score. The scores can then be used in the calculation of the score for a member company. Scores for non-member companies, i.e. suppliers need not be made publicly available. Companies that are members of the environmental scoring scheme can inform one another so that companies can be aware if their suppliers have such an environmental score. If not, since the score for the suppliers will affect the score for the member company, a member company will be inherently encouraged to encourage or require suppliers to become members and acquire an environmental score. The whole system is geared towards improving environmental scores for companies and therefore there actual environmental performance.

It can be seen from this embodiment of the present invention that a fully automated data processing system is provided. Accounts data for a company can be automatically uploaded for processing by the environmental score processor. The environmental score processor can then automatically determine whether public accounts data is required for suppliers in order to complete the calculation of the score for the member company. If a score for a supplier company is not available, the environmental score processor can automatically retrieve the necessary published accounts data in order to calculate a score for the supplier company and thus complete the calculation of the score for the member company.

Since the environmental score can be generated for any type of company independent of type and size, it is a useful indicator of environmental performance of a company. Thus, managers of a business use the score to manage the business by comparing the score for different financial periods. For example, the manager of a business, or part of a business, could modify the management of a business in order to improve the environmental score.

Fund managers can also use the environmental score for companies when managing funds. The investment market currently offers many environmentally friendly or conscious funds. The problem for fund managers of such funds is to be able to readily identify the environmental performance of companies to determine whether they fit the necessary profile to be included within the fund. Thus the score can be used by fund managers in the management of funds by comparing the environmental scores for different companies or for a company for different financial periods. Thus, the environmental score can assist fund managers in their investment decisions. The method is all-inclusive as opposed to the exclusive nature of the current screening mechanisms employed by current fund managers to establish an environmental/ethical investment portfolio.

Although no assumption is made about environmental sustainability, the 'full cost accounting' technique disclosed hereinabove is a prerequisite to Environmentally Sustainable development.

Although the present invention has been described hereinabove with reference to the specific embodiments, it will be apparent to a skilled person in the art that modifications lie within the spirit and scope of the present invention.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A computer system for calculating a score for a separately accountable business unit, the computer system comprising:
   a program memory storing code for controlling a processor;
   a score memory storing the score for the separately accountable business unit, the score being indicative of impact on the environment as a consequence of the economic activities of the separately accountable business unit; and
   a processor connected to the program memory for reading and being controlled by the code;
   wherein the program memory stores:
   accessing code for controlling the processor to access financial account data indicative of recognized costs for the separately accountable business unit;
   financial account processing code for controlling the processor to process the financial account data by adding external environmental costs to the recognized costs to calculate the score for the separately accountable business unit using the processed financial account data, and to store the calculated score in the score memory, wherein the external environmental costs comprise costs required to preserve the environment as a consequence of the economic activities of the separately accountable business unit; and
   supplier score accessing code for accessing scores indicative of environmental impact for suppliers of at least one of goods and services to the separately accountable business unit;
   wherein said supplier score accessing code includes supplier account data, and supplier score determining code for determining scores for the suppliers using the account data and environmental information, and said financial account processing code is adapted to process the account data using scores accessed for the suppliers.

2. The computer system according to claim 1, wherein said financial account processing code is adapted to process the financial account data and calculate the score by taking the ratio of the recognized costs to total costs comprising recognized costs plus external environmental costs.

3. The computer system according to claim 1, wherein said accessing code is adapted to access financial account data indicative of recognized costs and profit or loss for the separately accountable business unit, and said financial account processing code is adapted to process the financial account data also using the profit or loss.

4. The computer system according to claim 1, wherein said financial account processing code is adapted to process the financial account data by allocating common price units to all the inputs to and outputs from the economic activities of the separately accountable business unit.

5. The computer system according to claim 1, wherein said financial account processing code is adapted to process the financial account data to identify and weight costs associated with suppliers using the scores for the suppliers.

6. The computer system according to claim 1, wherein said accessing code is adapted to assign a precautionary score to a supplier if suppliers financial account data is not available, where said precautionary score indicates a high level of unaccounted for external environmental cost.

7. The computer system according to claim 1, wherein said accessing code is adapted to assign a precautionary score to a supplier if environmental information for the supplier is not available, where said precautionary score indicates a high level of unaccounted for external environmental cost.

8. The computer system according to claim 1, wherein said financial account processing code is adapted to calculate the score to vary between a first value indicating the business unit has internalized all external environmental costs associated with its economic activity and a second value indicating that the business unit has large external environmental costs associated with its economic activity.

9. The computer system according to claim 2, wherein said financial account processing code is adapted to calculate the score as a percentage between 100% indicating the business unit has internalized all environmental costs associated with its economic activity and close to 0% indicating that the business unit has large external environmental costs associated with its economic activity.

10. The computer system according to claim 1, wherein said separately accountable business unit comprises:
a business including a partnership, person, charity, or company,
department or division of a business,
a service or product,
or group of services or products.

11. The computer system according to claim 1, including external environmental cost determining code for determining the external environmental costs for the separately accountable business unit as a function of economic inputs and economic outputs for the separately accountable business unit.

12. The computer system according to claim 11, wherein said external environmental costs determining code is adapted to determine external environmental costs for the economic inputs as a function of the recognized costs for the economic inputs and external environmental costs for the economic outputs as a function of the recognized costs for the economic outputs.

13. The computer system according to claim 12, wherein said external environmental cost determining code is adapted to determine said external environmental costs for the economic inputs as by weighting the recognized costs for the economic inputs by an environmental input cost weight and said environmental costs for the economic outputs by weighting the recognized costs for the economic output by an environmental output cost weight.

14. The computer system according to claim 1, including a network interface for interfacing to a network to allow access to the calculated score from a remote computer.

15. The computer system according to claim 14, wherein said network interface is adapted to receive the financial account data for the business unit, and said accessing code is adapted to access the received financial account data.

16. A storage medium storing computer code for controlling a computer to calculate a score for a separately accountable business unit, the code stored in the storage medium comprising:
accessing code for controlling the computer to access financial account data indicative of recognized costs for the separately accountable business unit;
financial account processing code for controlling the computer to process the financial account data by adding external environmental costs to the recognized costs to calculate a score for the separately accountable business unit using the processed financial account data, and to store the calculated score in a score memory, wherein:
the score is indicative of impact on the environment as a consequence of economic activities of the separately accountable business unit; and
the external environmental costs comprise costs required to preserve the environment as a consequence of the economic activities of the separately accountable business unit; and
supplier score accessing code for accessing scores indicative of environmental impact for suppliers of goods and/or services to the separately accountable business unit;
wherein said accessing code includes supplier accounts data acquisition code for acquiring suppliers accounts data, and supplier score determining code for determining the scores for the suppliers using the accounts data and environmental information, and said accounts processing code is adapted to process the accounts data using scores accessed for the suppliers.

* * * * *